United States Patent

[11] 3,583,243

| [72] | Inventor | Harry R. Wilson<br>319 Drake St., Libertyville, Ill. 60048 |
|---|---|---|
| [21] | Appl. No. | 824,367 |
| [22] | Filed | May 5, 1969<br>Continuation-in-part of Ser. No. 590,000,<br>Oct. 27, 1966, abandoned. |
| [45] | Patented | June 8, 1971 |

[54] METHOD AND APPARATUS FOR CONTROLLING VEHICLE DRIVE AND POWER TAKEOFF
12 Claims, 3 Drawing Figs.

[52] U.S. Cl.................................................. 74/15.84,
74/688, 192/3.33, 192/56, 192/150, 192/109
[51] Int. Cl..................................................... F16d 47/06
[50] Field of Search........................................... 74/15.84;
192/3.33, 3.21, 56 F, 150; 74/688, 733

[56] References Cited
UNITED STATES PATENTS

| 3,006,199 | 10/1961 | Christenson et al. | 74/15.84 |
| 3,202,018 | 8/1965 | Hilpert | 192/3.33X |
| 3,384,209 | 5/1968 | Murphy | 192/3.33 |
| 3,258,081 | 6/1966 | Kugel et al. | 192/3.21X |
| 2,466,244 | 4/1949 | Kelbel | 74/688 |
| 3,478,621 | 11/1969 | Johnson et al. | 192/3.33X |

*Primary Examiner*—Benjamin W. Wyche
*Attorney*—Noel G. Artman

ABSTRACT: A vehicle having an engine, operated at constant speed, driving both a power takeoff and traction wheels, the latter through a pressure-actuated slip clutch, torque converter and transmission. A manually operable control valve modulates pressure to the slip clutch to control ground speed and a power sensing means further modulates slip clutch pressure responsive to the load imposed on the power takeoff to divert engine power from the ground wheels to fulfill the power required by the power takeoff.

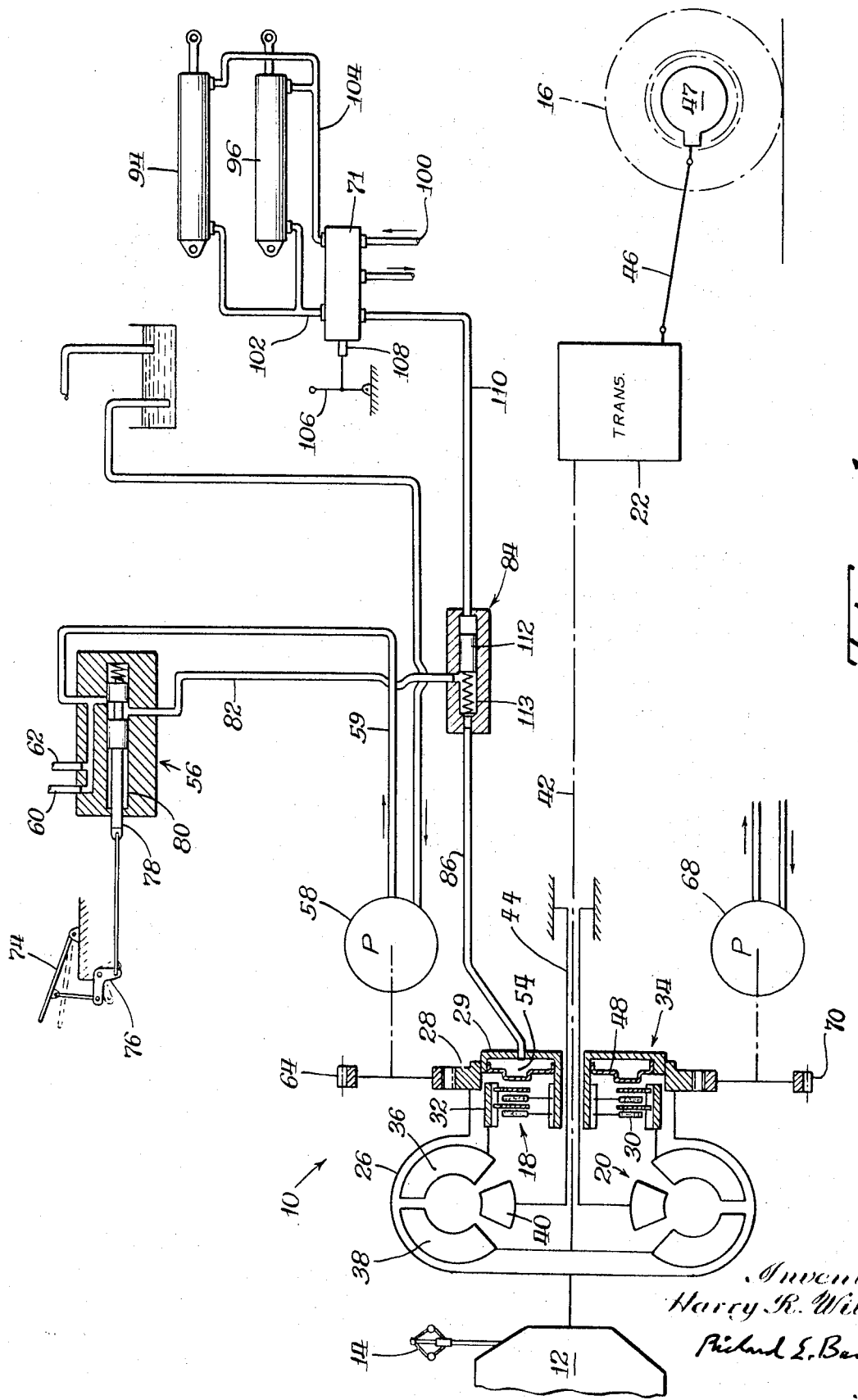

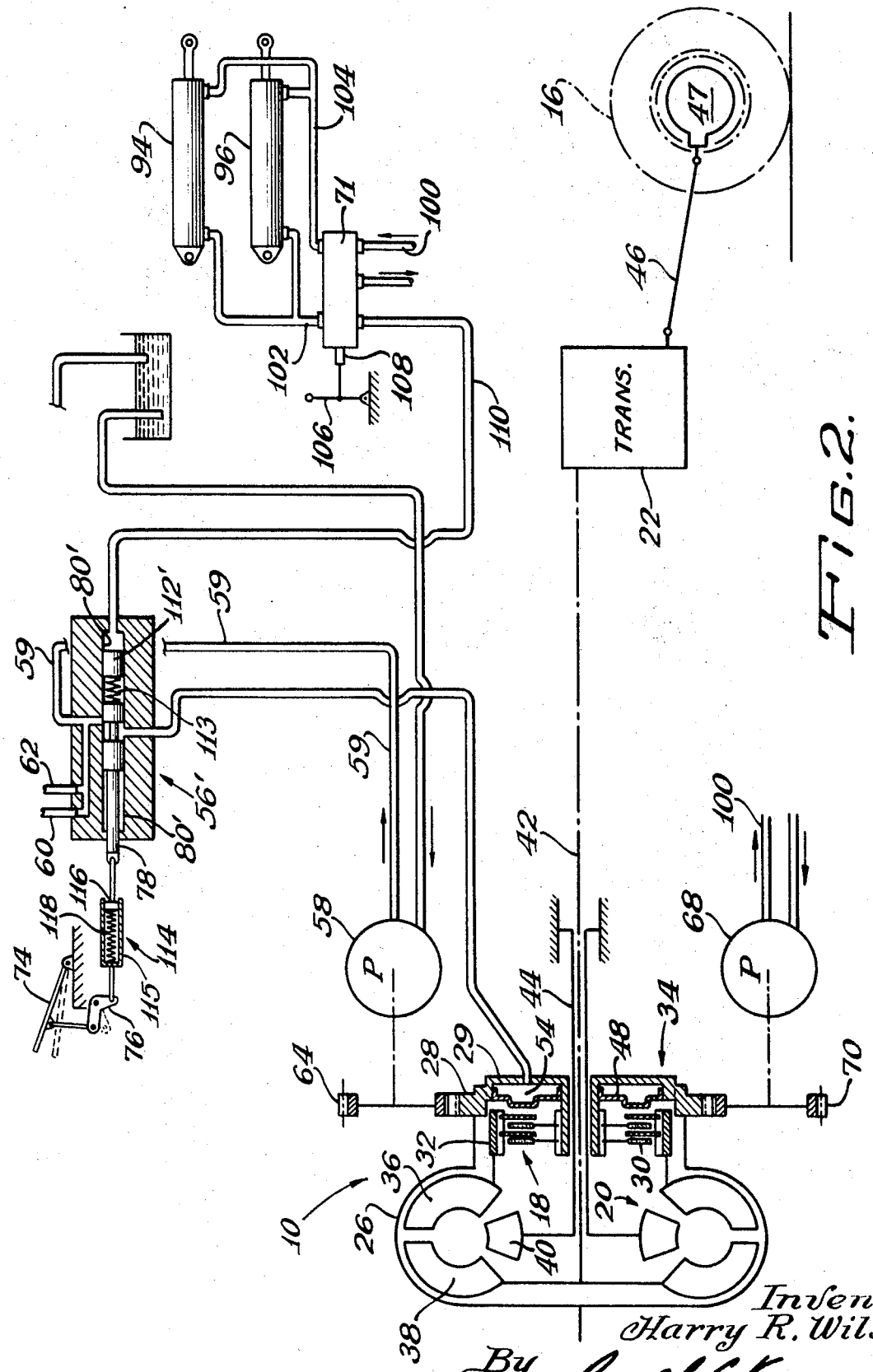

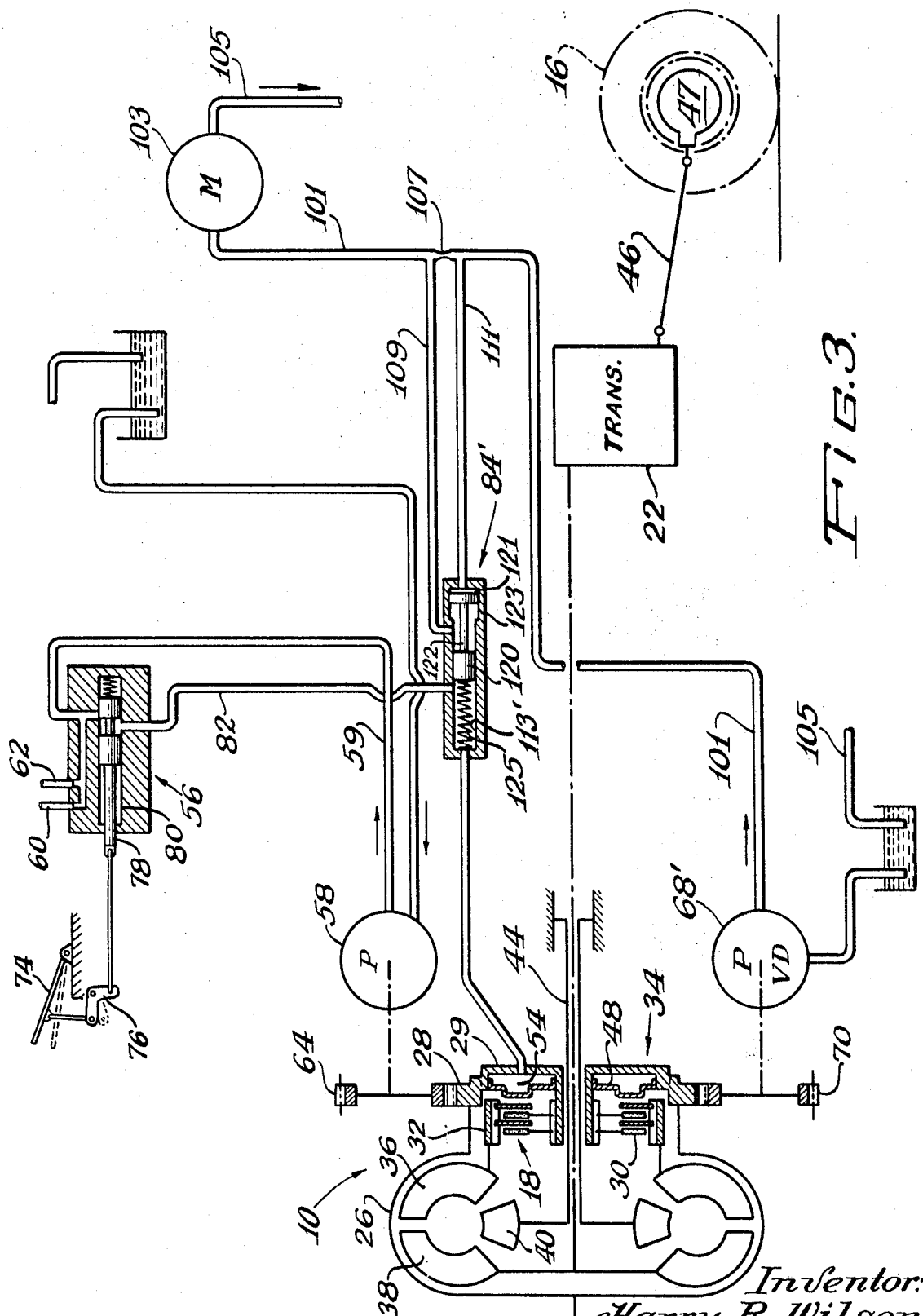

METHOD AND APPARATUS FOR CONTROLLING VEHICLE DRIVE AND POWER TAKEOFF

This application is continuation in part of application Ser. No. 590,000, filed Oct. 27, 1966, and now abandoned.

This invention relates in general to construction vehicles and more particularly relates to a novel method of controlling the power transmitted from an engine to the traction means for a construction vehicle.

Conventional power transmission means for construction vehicles include an engine driving a torque converter which in turn drives a clutch and change-speed transmission for delivering power to the vehicle's traction means, such as endless tracks or rubber tired wheels. The method of controlling this type of drive train is to operate the clutch while changing gears in the transmission and then controlling engine speed to control the power delivered to the traction means. This type of operation has many inherent disadvantages. Thus, the shifting shocks in the drive train result in reduced life of the component elements in the vehicle. Since the clutch is positioned in the drive train after the torque converter, it must absorb a large amount of torque as it shifts, with the result that its reliability and life is adversely affected. Moreover, with the engine speed varied to control ground speed, the hydraulic pumps for operating the steering and loader actuators, which are geared directly to the engine, will also be operated at varying speeds.

Therefore, the flow rate delivered by the pumps to the motors fluctuates widely with the result that uniform operation of the steering and loader mechanisms is impossible to obtain.

Accordingly it is an object of the present invention to provide a method of controlling the power drive train for a construction vehicle in which the vehicle engine is operated at a constant speed to provide uniform hydraulic pump delivery and in which a slip clutch provided between the engine and hydrodynamic power transmitting means in the drive train is varied to control the power delivered to the traction means of the vehicle.

Another object of the present invention is to provide a method for controlling the power transmitted from an engine to the traction means on a construction vehicle in which a slip clutch is provided between the engine and torque converter in the drive train whereby the engine is operated at a substantially constant speed to in turn operate fluid pressure means at a substantially constant delivery rate and in which the amount of slippage in the clutch is selectively varied to control the power delivered to the traction means.

Another important object of this invention is to provide a method for controlling the power transmitted from an engine to the traction means for delivering fluid pressure to a load handling implement and in which a slip clutch is provided between the engine and torque converter in the drive train wherein the engine is operated at a substantially constant speed with the amount of clutch slippage varied to control vehicle ground speed and in which the clutch is also slipped as a direct function of the pressure in the fluid pressure means to maintain said constant engine speed.

Still another object of this invention is to provide a method of controlling the power transmitted from an engine to the traction means on a vehicle in which a slip clutch is provided between the engine and an hydrodynamic power transmitting device driving a change-speed transmission which in turn drives a traction means, in which the engine is operated at a substantially constant speed, in which the clutch is disengaged for selecting a transmission speed ratio and in which clutch slippage is modulated to control vehicle ground speed while maintaining the selected speed ratio.

It is also an object of this invention to provide an arrangement for dividing an engine's output between a traction drive and a power takeoff in proportion to the power required by the takeoff.

These and other objects and advantages of the present invention will become apparent to those skilled in the art when the following specification is read in conjunction with accompanying drawings wherein:

FIG. 1 is a schematic view of a power transmitting drive train for a construction vehicle incorporating features of the present invention;

FIG. 2 is a schematic view similar to FIG. 1 illustrating another means for modulating slip clutch pressure in response to the power requirements of the auxiliary equipment; and FIG. 3 is a schematic view of a third embodiment illustrating a flow control means for sensing the power requirements of the auxiliary equipment and modulating the slip clutch pressure in response to such power requirements.

Referring now to the drawings, FIG. 1 illustrates a schematic view of a preferred embodiment of the invention incorporating the power transmitting drive train indicated generally at 10. It is intended that the drive train 10 may be employed on a variety of construction vehicles, including rubber tired front end loader vehicles. In a preferred embodiment of the invention a prime mover mounted on the vehicle frame comprises an internal combustion engine 12 which is controlled by means of conventional governor 14 to run at constant speed. Power is delivered from engine 12 through drive train 10 to the ground engaging traction means on the vehicle which comprises the rubber tired wheels 16.

The engine is in driving connection with a conventional friction slip clutch 18 which in turn is in driving connection with an hydrodynamic power transmitting means 20. In the preferred embodiment power transmitting means 20 comprises a conventional torque converter. This torque converter is in driving connection with a conventional change-speed and reversing transmission 22 which drives wheels 16.

The output shaft on engine 12 is in driving connection with shroud 26 of power transmitting means 20. The end of this shroud is secured to annular ring gear 28 which in turn is connected with reaction member 29 of the slip clutch. A plurality of interleaved clutch plates comprise a clutch pack 30 between the reaction member and an annular splined output member 32. A conventional hydraulically operated servomotor 34 is provided to progressively engage and disengage clutch 18. The amount of slippage of clutch 18 is modulated by the servomotor in a manner to be presently described.

Output member 32 of clutch 18 is in driving connection with impeller wheel 36 of the torque converter. A turbine wheel 38 and stator 40 complete the flow path for the torque converter. Turbine 38 is keyed to drive shaft 42 which in turn is connected with transmission 22. Stator 40 is keyed to a grounded quill shaft 44. Transmission 22 drives wheels 16 through final drive shaft 46 and rear axle 47.

The servomotor 34 for the slip clutch comprises annular piston 48 which is axially slidable within chamber 54 of reaction member 29. Leakage between the piston 48 and the walls of the member 29 permits fluid flow through the chamber 54. With no fluid pressure in the chamber, piston 48 is normally urged to its seated position against the reaction member by conventional spring means (not shown). This completely disengages clutch 18. The piston is moved against the clutch pack with a force depending on the fluid pressure within the chamber. This force controls the amount of engagement, or conversely the amount of slippage, in the clutch to in turn control the torque delivered from engine 12 to impeller wheel 36.

The pressure in servomotor 34 is controlled by the operator through manipulation of modulating control valve 56. Hydraulic pump 58 supplies fluid under pressure through conduit 59 to valve 56 for the modulating control function. Fluid from pump 58 is also directed from the control valve through conduit 60 to charge the torque converter and through conduit 62 to supply control fluid for transmission 22. Pump 58 is driven by means of gear 64 which meshes with ring gear 28.

A second hydraulic pump 68 is also driven by means of a gear 70 meshing with ring gear 28. Pump 68 supplies fluid under pressure to a conventional steering control valve (not shown), and also to a loader control valve 71.

With engine 12 driven at a constant speed both of the pumps 58 and 68 will deliver fluid under pressure at a uniform flow rate. This means that the performance of the loader mechanism and steering system is greatly improved since their operation is not dependent on a fluctuating flow rate as with conventional vehicles in which engine speed is varied.

Vehicle ground speed is controlled by the operator through means of a foot operated control treadle 74 which pivots bellcrank lever 76 to operate valve spool 78 of control valve 56. As treadle 74 is depressed, spool 78 is moved progressively into bore 80 of the valve. This establishes fluid communication from conduit 59 into bore 80, then into conduit 82, through overload valve 84, into conduit 86, and then to chamber 54 of the clutch. The pressure in chamber 54 is modulated as a direct function of the movement of spool 78. This pressure regulates the force on clutch 18 and therefore the amount of slippage in the clutch.

The degree of clutch slippage in turn controls the ground speed of the vehicle. With engine 12 operating at a constant speed and transmission 22 in a given speed ratio setting, the amount of power delivered to wheels 16 and therefore the speed of the vehicle is controlled by slipping the clutch 18 to control the speed of torque converter impeller 36. This in turn controls the power output of the torque converter. Thus, as the pressure in servomotor 34 increases, the amount of slippage in the clutch decreases and the speed of impeller 36 increases. This increases the torque output and speed of drive shaft 42.

With slip clutch 18 positioned between the engine and power converter the amount of torque required to be absorbed by the clutch is greatly reduced as compared to designs in which the clutch is positioned between the torque converter and transmission. In the latter case the slipping clutch would have to be capable of absorbing the maximum output horsepower of the converter. In one embodiment of applicant's invention it has been found that the slip clutch need only be capable of absorbing approximately 17 percent of this horsepower. This means that clutch life will be greatly extended.

During shifting of the transmission to change speed or direction, clutch 18 may be slipped through operation of treadle 74 to obtain a smoother shifting operation. This substantially eliminates shock in the transmission elements and universal connections to provide a longer life for the drive train. After a given speed ratio is selected, vehicle ground speed may be controlled by operation of the slip clutch without changing gears and without reducing engine speed.

Another feature of applicant's invention comprises an automatic feed back circuit to prevent the engine from lugging down when the load handling implement encounters a heavy load. A pair of hydraulic rams 94 and 96 may be connected with the load handling implement such as a pair of boom arms supporting a digging bucket (not shown). The implement control valve 71 receives fluid under pressure through conduit 100 from pump 68 and selectively directs the fluid through one of the conduits 102 and 104 upon manipulation of lever 106 and valve spool 108 to extend or retract the rams. When the load on the implement increases, the pressure in conduits 102 and 104 correspondingly increases. This pressure is transmitted back to the control valve 71 where it is transmitted through feedback conduit 110. Conduit 110 is connected with the overload valve 84 which comprises a piston 112 slidable within bore 113. The piston is normally urged to the right side of the bore where it permits fluid communication from control valve 56 through conduits 82 and 86 into servomotor 34. Feedback fluid pressure from conduit 110 will operate piston 112 to the left, thus restricting fluid flow into conduit 86. This functions to reduce the pressure in servomotor 34 and thus increase the amount of clutch slippage.

In operation, assuming that the constant speed engine 12 is delivering full horsepower to the various control circuits, hydraulic rams for the implement, and traction means 16, an increase in the load handled by the implement would be fed back through the circuit as increased pressure. In existing designs this would increase the load on pump 68 and in turn lug the engine down. With applicant's invention, an increased load on the implement will operate overload valve 84 to automatically permit clutch 18 to slip and thus reduce the amount of power delivered to the traction means. The engine 12 would then be capable of delivering more power to drive pump 68 and operate the implement. This means that the loader will be able to complete its cycle without stalling the engine.

Another embodiment of the invention, as illustrated in FIG. 2, utilizes a single fluid modulating valve 56' which is positioned by both an operator controlled input and a pressure input from the auxiliary equipment. Basically, the functions of both modulating control valve 56 and overload valve 84 in the embodiment shown in FIG. 1 are combined in the modulating control valve 56' in the embodiment of FIG. 2. The spool 78 is reciprocably mounted in the bore 80' of the modulating control valve 56' and is arranged so that the lands on the spool 78 modulate the pressure between the pump pressure conduit 59 and the clutch pressure conduits 82 and 86. One input force for positioning the spool 78 is provided by a plunger 112' reciprocably retained within the bore 80'. A spring 113 is positioned within the bore 80' between the plunger 112' and the spool 78. The feedback conduit 110 communicates with one end of the bore 80'. Hence, the resistance encountered by the actuators 94 and 96, which necessitates the diverting of more power from the traction wheels 16 to the pump 68, will be reflected in higher pressure being transmitted through the conduit 110 to the outer face of the plunger 112'. This pressure acting on the plunger 112' will urge the plunger to the left, as viewed in FIG. 2, thereby compressing the spring 113 and exerting a force on the spool 78. This force will also be toward the left tending to decrease the pressure to the clutch and increasing its slippage. The other input force on the spool 78 is provided by a lost motion connection 114 interposed in the mechanical link between the bellcrank 76 and the spool 78. The connection 114 comprises a cylindrical member 115 affixed to a rod portion pivotally attached to the bellcrank 76 and a piston member 116 affixed to a rod portion pivotally connected to the free end of the spool 78. A compression spring 118 is trapped within the cylindrical member 115 between its closed end and the piston member 116. Depression of the treadle tends to compress the spring 118 and thereby exert a force on the spool 78 urging it toward the right, as viewed in FIG. 2, which would increase the pressure to the clutch and decrease its slippage. It can be seen, therefore, that the position of the spool 78, and hence the pressure to the clutch, is determined by both the force exerted by the spring 118 which depends upon the position of treadle 74 and the oppositely directed force exerted by the spring 113 which depends upon the pressure present in the feedback conduit 110 acting on the working face of the plunger 112'.

A third embodiment of the invention, as illustrated in FIG. 3, provides a means for diverting power from the traction wheels to the auxiliary equipment in response to either or both a change in pressure and a change in flow. When a vehicle has an engine which has insufficient power to drive the traction wheels at maximum power and simultaneously fulfill the power requirements of the auxiliary equipment, it is apparent that power must be diverted from the traction wheels when the power requirements of the auxiliary equipment increases. The power requirements of hydraulically actuated auxiliary equipment is a function of both pressure and rate of flow of the hydraulic fluid. The previously described embodiments are responsive to pressure only and are not affected by changes in flow rate at the same or substantially the same flow rate. The embodiment of FIG. 3 does provide a means for modulating slip clutch pressure in response to both the pressure changes and changes in the flow rate. The power takeoff driven pump 68' is a variable displacement pump which provides variable flow rates of hydraulic fluid at the same speed of pump rotation. A conduit 101 connects the pump 68' to a hydraulic motor 103, which may drive the elevator means of an elevating scraper, for example. The fluid exhausted from the motor 103 is returned to the reservoir through a conduit 105. Interposed in the conduit 101 is an orifice 107, which orifice is sized to permit a small pressure drop thereacross in direct relationship to the rate of flow through the conduit 101. The overload valve 84' is connected between conduits 82 and 86 so that piston 120 can modulate pressure to the slip clutch, in the same manner that piston 112 in valve 84 modulates pressure in the embodiment of FIG. 1. The overload valve 84' comprises a piston 120 slidable in a bore 113' to progressively block or uncover the communication of conduit 82 with the bore 113'. A second piston member 121 is attached to the modulating piston 120 by means of a reduced diameter member 122 and is slidably retained within an enlarged portion 123 of the bore 113'. A spring 123 urges the entire piston assembly to the right to uncover the conduit 82. A pair of conduits 109 and 111 are in communication with the conduit 101 on either side of the orifice 107. The upstream conduit 111 is connected to the valve 84' to permit the higher pressure to act upon the large area of the piston member 121, which the downstream conduit 109 is connected to the valve 84' between the piston 120 and the piston member 121, and permits the lower pressure to act on the smaller or inside area of the piston member 121. The lower pressure exerts a net force to the right on the piston 120 since the inside area of the piston 120 is smaller than the inside area of the piston member 121. It will be apparent that when the pump 68' is actuated to change its displacement, the flow rate through conduit 101 will change although not necessarily with an appreciable change in pressure. An increased flow rate will result in a greater pressure differential across the orifice 107. This pressure differential will be communicated to the piston member 121 through the conduits 109 and 111. The piston member 121 will be subjected to a net force tending to shift the piston 120 toward the conduit 82 further modulating the pressure to the clutch and increasing its slippage. A reduced flow will have the opposite effect. The differential in areas on each side of the piston member 121 will also provide a response to changes in pressure in conduit 101, though there is no change in flow rate.

It will also be apparent that the valve 84' could be incorporated into the valve 56 of FIG. 1, in the same manner in which the valve 84 was incorporated into the valve 56' of FIG. 2. That is, instead of providing a series connection between the valve 56 and valve 84' as shown in FIG. 3, the piston 120 and piston member 121 could be arranged to act directly on the spool 78, provided a lost motion connection, similar to that shown in FIG. 2, were interposed between the treadle 74 and the spool 78.

It will be understood that various changes in the details, steps and arrangement of parts which have been described and illustrated in order to explain the nature of the invention, may be made by those skilled in the art within the principle and scope in the invention.

What I claim is:

1. The method of controlling the power transmitted from an engine to the traction means for a vehicle wherein the engine drives pump means to deliver fluid under pressure to hydraulic actuators and further drives a friction clutch adapted to progressively slip between fully engaged and disengaged condition, comprising the steps of:

operating the engine at a substantially constant speed to in turn operate the pump means at a substantially constant delivery rate;

selectively varying the amount of slippage in the clutch to control the power delivered to the traction means;

and increasing the amount of slippage in the clutch in response to a predetermined increase in the resistance encountered by said actuators.

2. In combination with a traction vehicle having hydraulic actuators, an engine governed to operate at a substantially constant speed, pump means driven by the engine for supplying hydraulic fluid under pressure, a torque converter capable of being driven by the engine and supplying power for traction, a pressure operated slip clutch interposed between the engine and said converter, first valve means for selectively varying the pressure in said clutch, and second valve means in series with said first valve means and said clutch responsive to increased pressure in said actuators for further limiting the pressure in said clutch.

3. In combination with a traction vehicle having auxiliary equipment for performing work against a resistance, an engine governed to operate at a substantially constant speed, power takeoff means driven by the engine and connected to drive said equipment, a torque converter capable of being driven by the engine and supplying power for traction, a pressure operated slip clutch interposed between the engine and said converter, first valve means for selectively varying the pressure in said clutch, and second valve means in series with said first valve means and said clutch responsive to an increase in the resistance encountered by the auxiliary equipment for further limiting the pressure in said clutch.

4. In combination with a traction vehicle having hydraulic actuators, an engine governed to operate at a substantially constant speed, pump means driven by the engine for supplying hydraulic fluid under pressure, a torque converter capable of being driven by the engine and supplying power for traction, a pressure operated slip clutch interposed between the engine and said converter, first valve means for selectively varying the pressure in said clutch;

manual control means operatively connected to said valve means, pressure control means operatively connected to said valve means and responsive to increased pressure in said actuators to urge said first valve means to limit the pressure in said clutch.

5. In a combination according to claim 4, and further comprising a lost-motion connection between said first valve means and said manual control means.

6. In combination with a traction vehicle having hydraulic actuator means, an engine governed to operate at a substantially constant speed, pump means driven by the engine for supplying fluid under pressure, a torque converter capable of being driven by the engine and supplying power for traction, a pressure operated slip clutch interposed between the engine and said converter, first valve means for selectively varying the pressure in said clutch, and second valve means in series with said first valve means and said clutch responsive to increased flow to said actuator means for further limiting the pressure in said clutch.

7. In a combination according to claim 6, wherein said second valve means is also responsive to increased pressure to said actuator means for furthering limiting the pressure in said clutch.

8. In a combination according to claim 7, wherein said pump has a variable displacement and said actuator is a rotary hydraulic motor.

9. In combination with a traction vehicle having hydraulic actuator means, an engine governed to operate at a substantially constant speed, pump means driven by the engine for supplying hydraulic fluid under pressure, a torque converter capable of being driven by the engine and supplying power for traction, a pressure operated slip clutch interposed between the engine and said converter, valve means for selectively varying the pressure in said clutch, manual control means operatively connected to said valve means for varying the pressure in said clutch in direct proportion to the desired ground speed.

and overload control means operatively connected to said valve means for imposing a limitation on the clutch pressure in proportion to the hydraulic requirements of said actuator means.

10. In a combination according to claim 9, wherein said overload control means is responsive to the pressure provided to said actuator means.

11. In a combination according to claim 9, wherein said overload control means is responsive to the flow requirements of said actuator means.

12. In combination with a traction vehicle having hydraulic actuator means, an engine governed to operate at a substantially constant speed, pump means driven by the engine for supplying hydraulic fluid under pressure, a torque converter capable of being driven by the engine and supplying power for traction, a pressure operated slip clutch interposed between the engine and said converter, valve means arranged in series with said clutch, and positioning means operatively connected to said valve means for limiting the pressure in said clutch as both a function of desired ground speed and the hydraulic requirements of said actuator means.